United States Patent
Vozhdaev et al.

(10) Patent No.: US 6,557,423 B1
(45) Date of Patent: May 6, 2003

(54) AIR-PRESSURE SENSOR

(75) Inventors: Evgeny Semenovich Vozhdaev, Moscow (RU); Vladimir Alexeevich Golovkin, Moskovskaya oblast (RU); Mikhail Alexeevich Golovkin, Moksovskaya oblast (RU); Andrei Alexandrovich Efremov, Moskovsakaya oblast (RU); Valery Pavlovich Gorban, Moscow (RU)

(73) Assignees: Gosudarstvennoe Unitarnoe Predpriyatie Tsentralny Aerogidrodinamichesky Institut Im. Prof. N. E. Zhukovskogo, Zhukovsky (RU); Federalnoe Agentstvo Po Pravovoi Zaschite Rezultatov Intellektualnoi Deyatelnosti Voennogo, Spetsialnogo I Dvoinogo Naznachenia Pri Ministerstve Justitsii Rossiiskoi Federatsii, Moscow (RU)

( * ) Notice: Subject to any disclaimer, the term of this patent is extended or adjusted under 35 U.S.C. 154(b) by 0 days.

(21) Appl. No.: 09/743,278

(22) PCT Filed: Jul. 5, 1999

(86) PCT No.: PCT/RU99/00220

§ 371 (c)(1),
(2), (4) Date: Jan. 8, 2001

(87) PCT Pub. No.: WO00/02026

PCT Pub. Date: Jan. 13, 2000

(30) Foreign Application Priority Data

Jul. 6, 1998 (RU) .......................................... 98112519

(51) Int. Cl.⁷ ................................................. G01F 1/46
(52) U.S. Cl. .................................................. 73/861.65
(58) Field of Search ........................ 73/861.65, 861.68, 73/861.66, 700

(56) References Cited

U.S. PATENT DOCUMENTS 3,673,866 A * 7/1972 Alperovich et al. ........... 73/212

(List continued on next page.)

FOREIGN PATENT DOCUMENTS

DE 30 38 180 5/1982

(List continued on next page.)

OTHER PUBLICATIONS

A.N. Petounin, Michinostroyeniye publishers, pp. 88–101, "Techniques and Equipment for Measuring Gas Flow Parameters", 1972 (with English translation).

(List continued on next page.)

Primary Examiner—Max Noori
Assistant Examiner—Jewel V. Thompson
(74) Attorney, Agent, or Firm—Oblon, Spivak, McClelland, Maier & Neustadt, P.C.

(57) ABSTRACT

An air-pressure head for determining parameters of an air flow, flow of other gases or fluids, as well as parameters of flight of the aircraft wherein the air-pressure head includes a multi-edged rod, whose edges are oriented in the longitudinal direction of the rod, having groups of orifices between the edges on smooth lateral surfaces of the rod which are connected via pneumatic ducts to outlet nipples disposed off the air flow. The edges in the longitudinal direction of the rod are continuous and the number n thereof is such that n<3. Groups of orifices are spaced from the edges at the values of $a \leq 0.1b$, where b is the distance between the edges in any cross-section of the rod. The angle between the lateral surfaces in any cross-section of the rod being $\gamma<180°$. Sharp edges can be rounded or rendered obtuse by chamfering and also can be implemented in the form of protrusions. The rod lateral surfaces can be convex, cylindrical and/or tapered. The number of edges on the rod can be four, five or six. Such parameters of the air-pressure head allow for improvement of the accuracy of flow (flight) parameters, to simplify the design and to reduce its weight.

9 Claims, 13 Drawing Sheets

U.S. PATENT DOCUMENTS 6,038,932 A * 3/2000 Wandel et al. ............ 73/861.65
6,134,972 A * 10/2000 Streckert et al. ......... 73/861.65

FOREIGN PATENT DOCUMENTS

| | | |
|---|---|---|
| DE | 35 12 960 | 10/1986 |
| EP | 0 049 756 | 12/1984 |
| EP | 0 409 178 | 1/1991 |
| RU | 1809341 | 4/1993 |
| RU | 2121667 | 11/1998 |

OTHER PUBLICATIONS

V.N. Glaznev, et al., Proceedings of Central Aerohydrodynamics Institute (TsAGI), vol. 14, No. 4, pp. 67–75, "A Method of Experimental Investigation of Planar and Axially Symmetrical Vortex–Free Flows Using a Cylindrical Pressure Head Within a Wide Range of M Numbers", 1983 (with English translation).

* cited by examiner

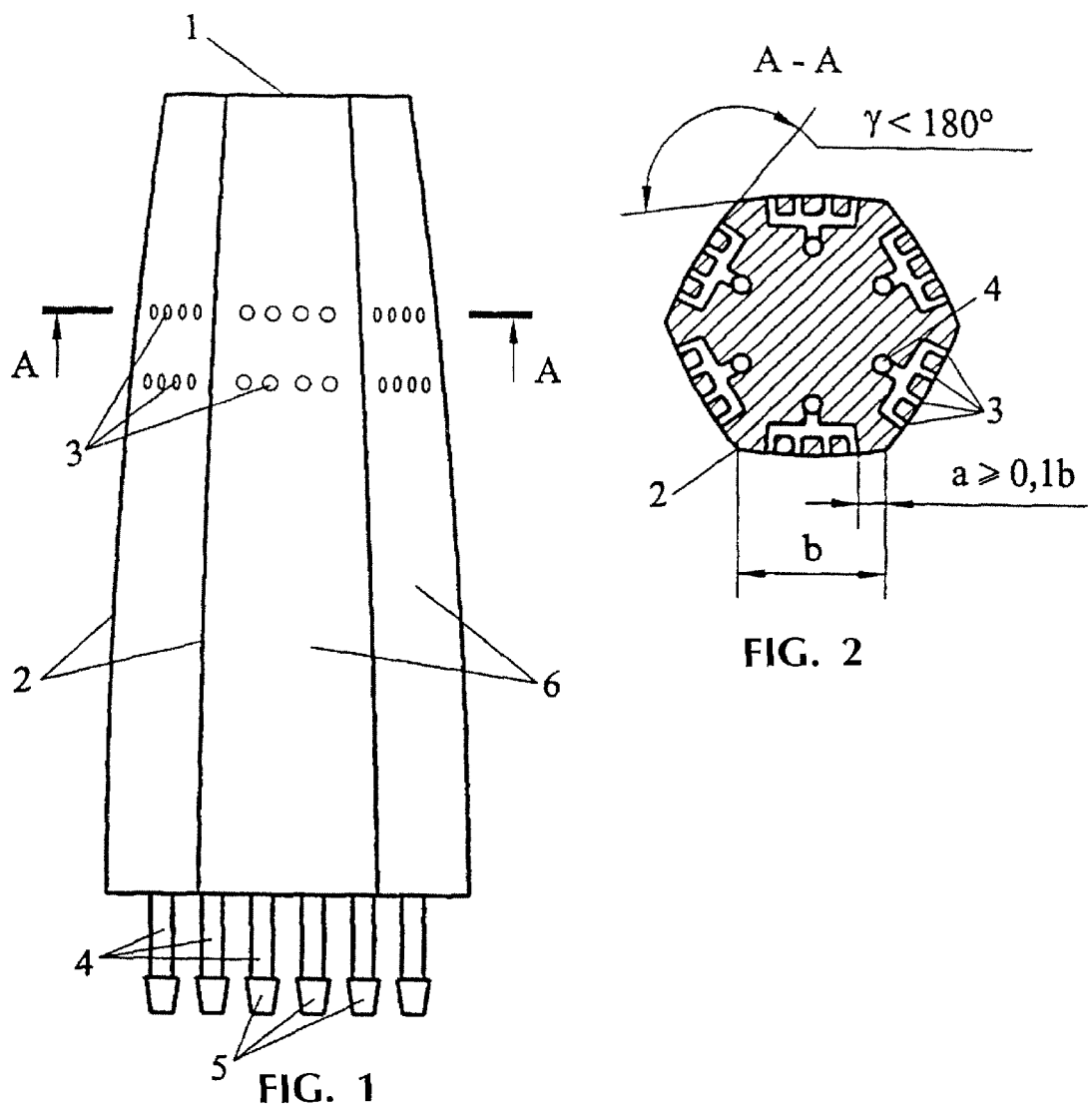
FIG. 2
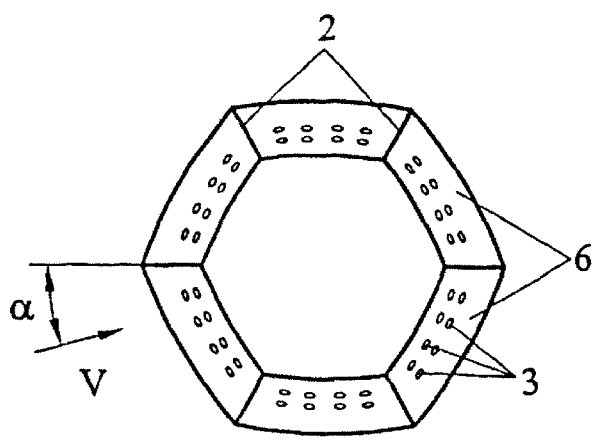
FIG. 1
FIG. 3

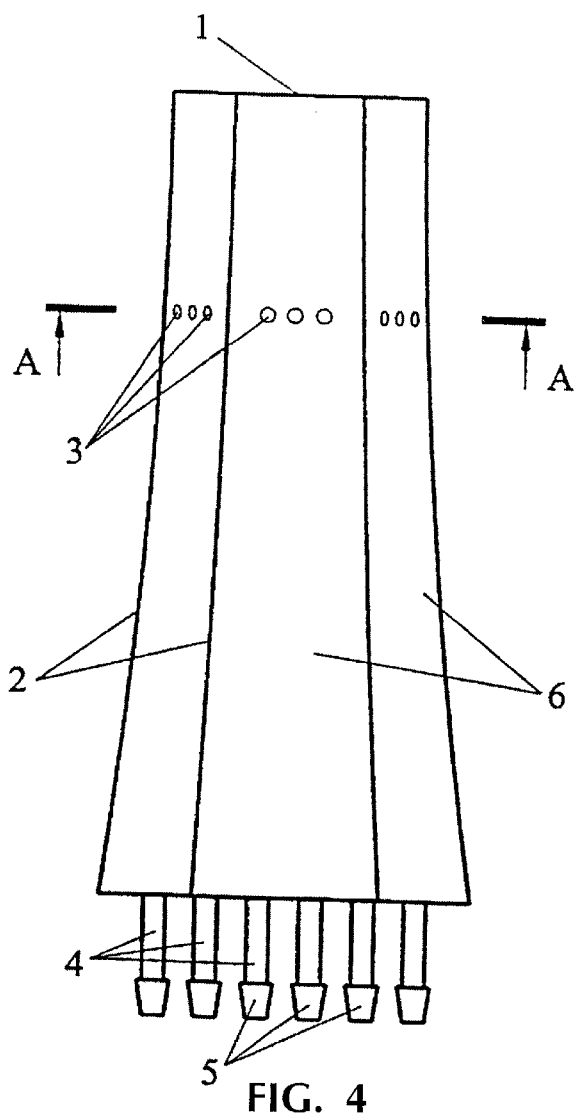
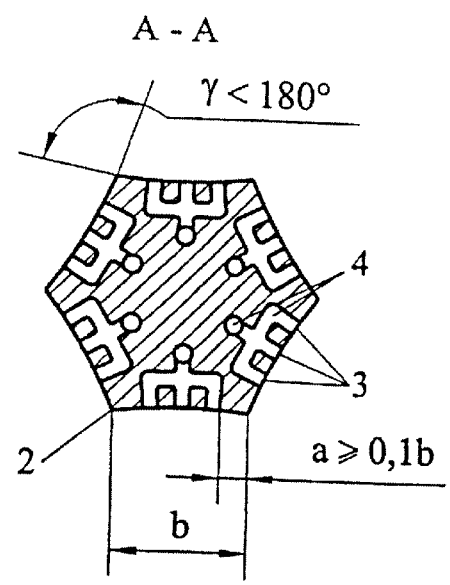
FIG. 5
FIG. 4
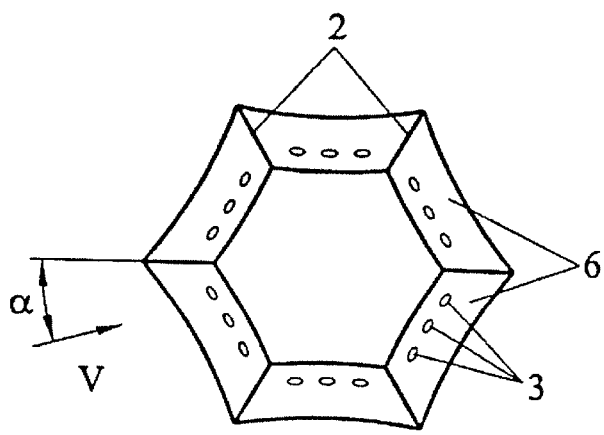
FIG. 6

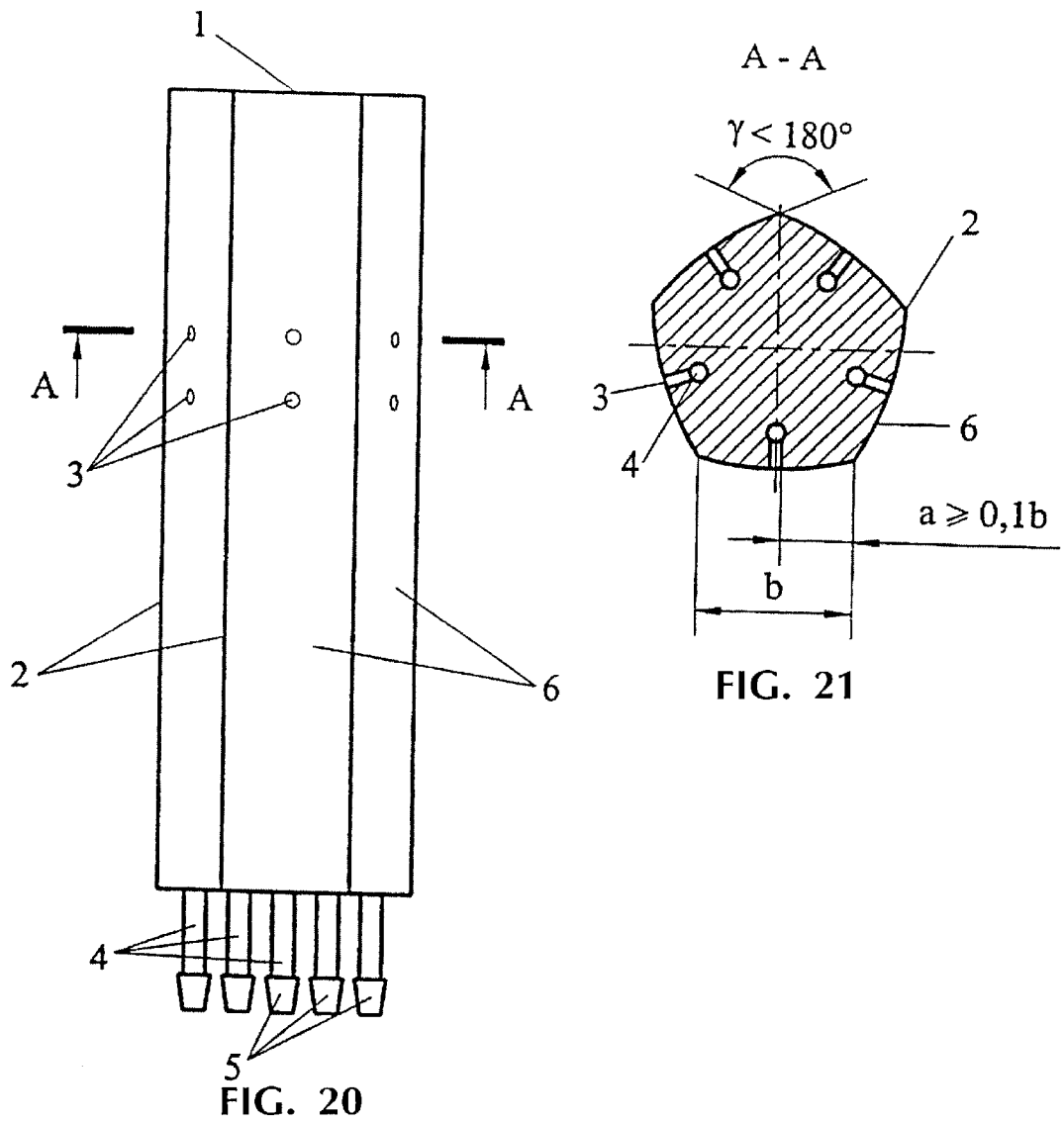
FIG. 21
FIG. 20
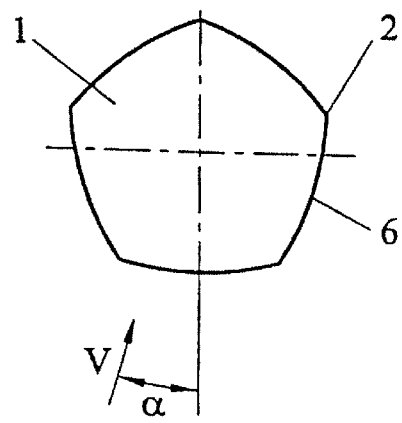
FIG. 22

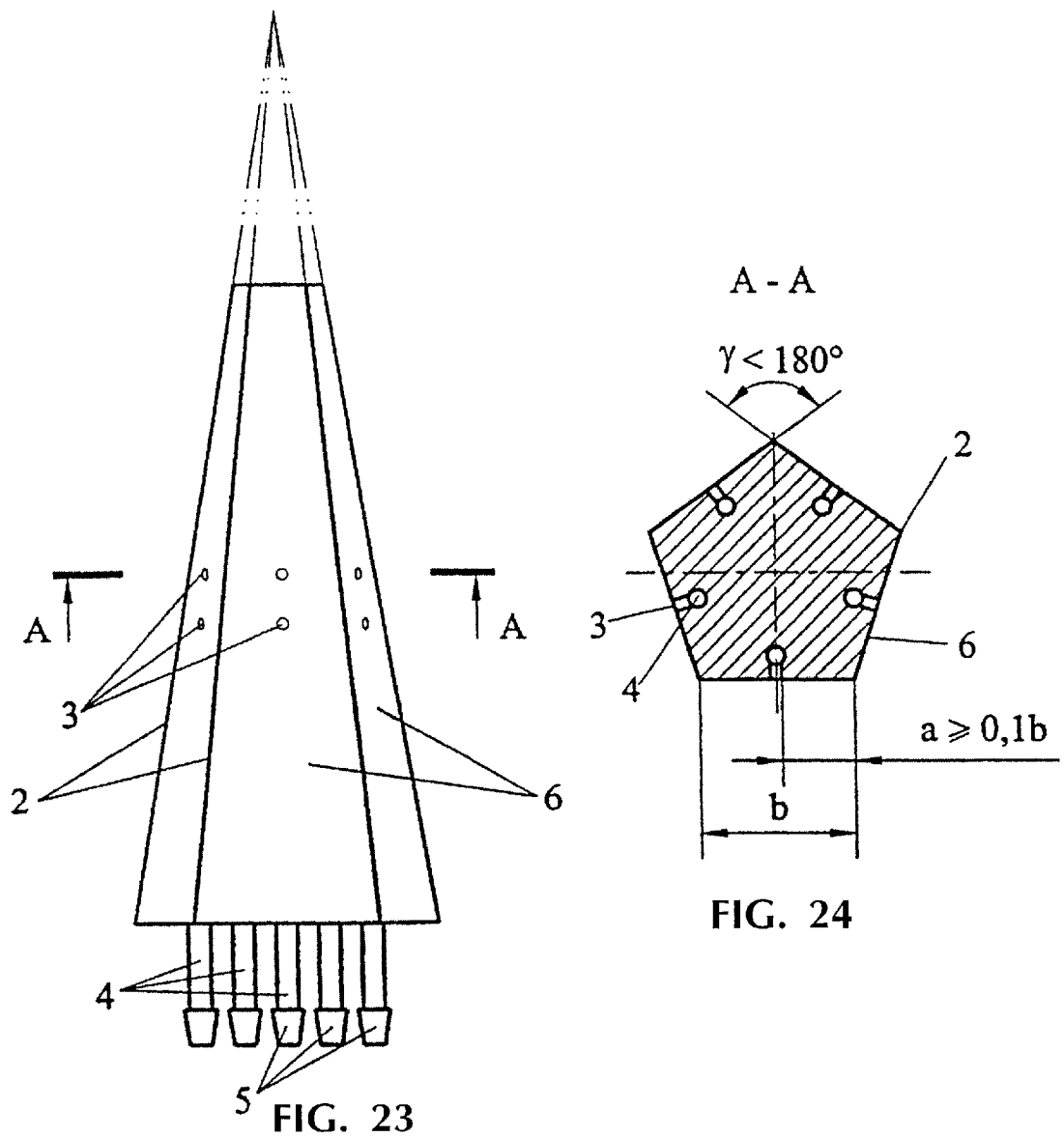
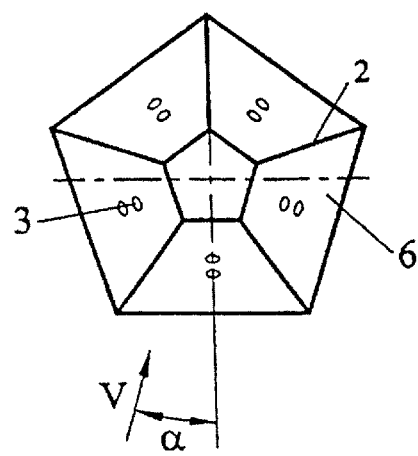
FIG. 23
FIG. 24
FIG. 25

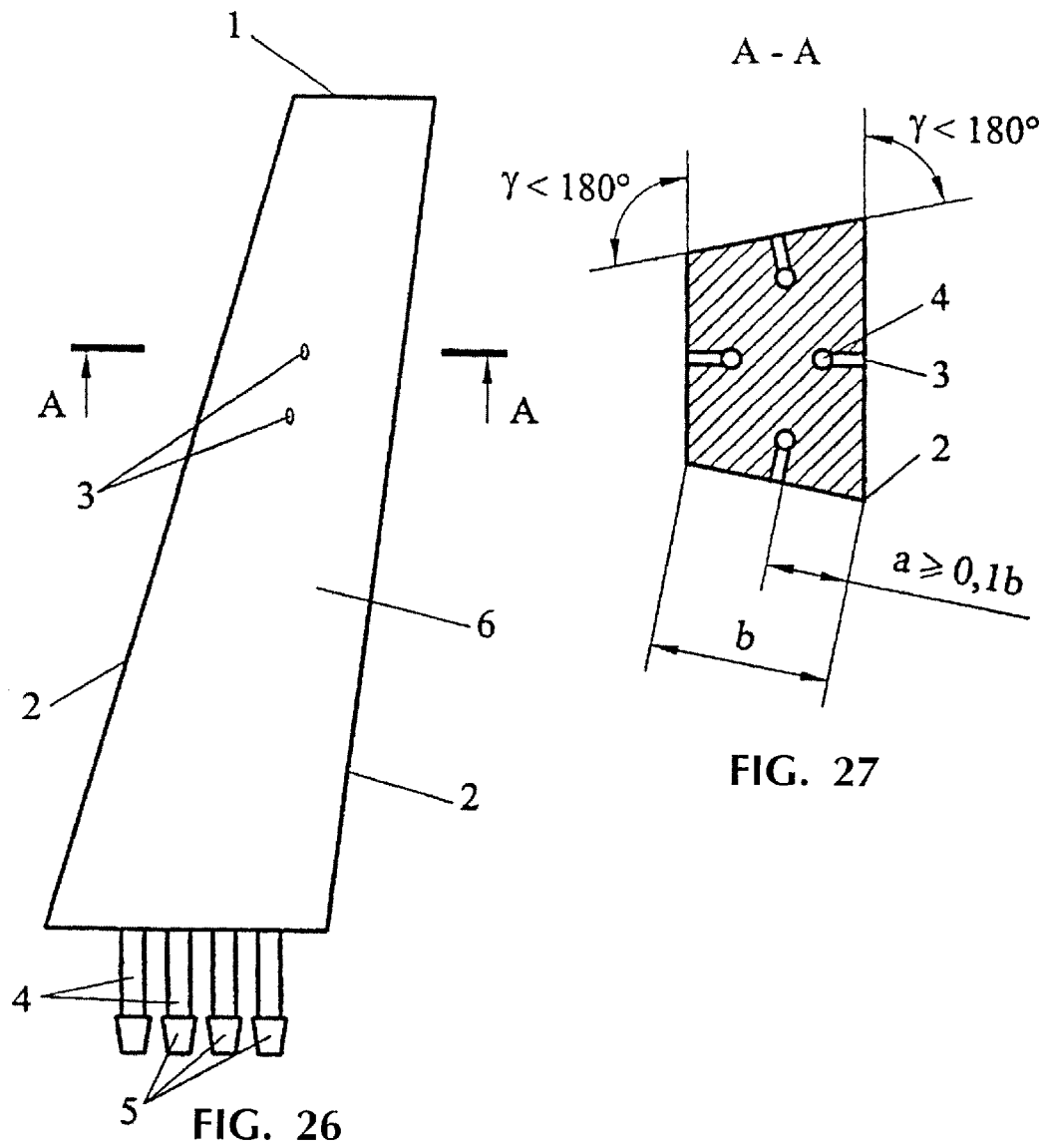
FIG. 27
FIG. 26
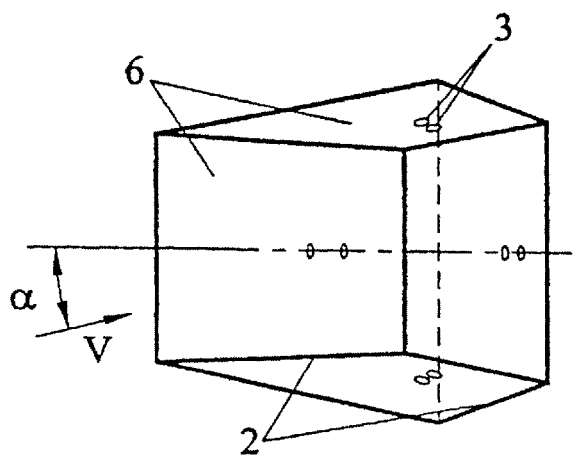
FIG. 28

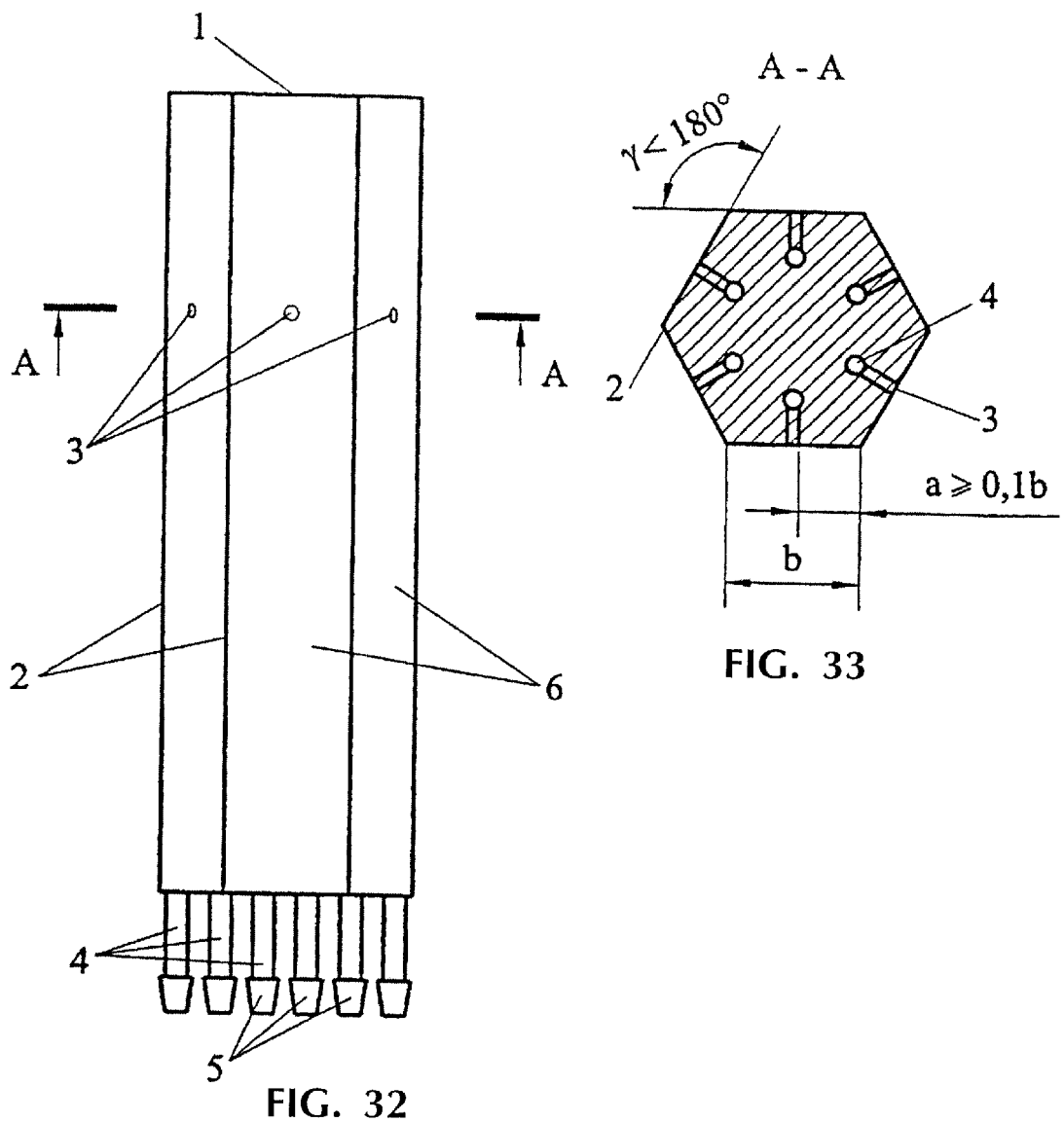
FIG. 33
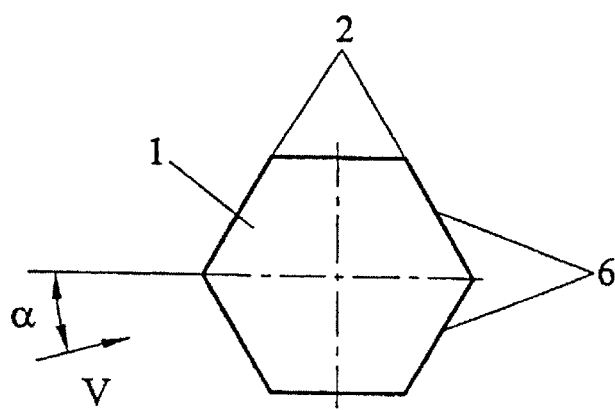
FIG. 32
FIG. 34

AIR-PRESSURE SENSOR

BACKGROUND OF THE INVENTION

1. Field of the Invention

The invention relates to determining flight parameters of the aircraft, or to other science and technology fields where fluid and gas flows are involved.

2. Description of the Related Art

Measurement of flow parameters is one of the most important concerns of atmospheric flight mechanics and aerodynamics of the aircraft. Presently, for measuring of flight (flow) parameters used are air-pressure heads (APH) frequently mounted directly on aircraft fuselage or any other component thereof, which heads measure actual parameters of a local flow approximating a planar flow. The aircraft are generally fitted with a plurality of such APH's that measure local parameters of a flow. True flight parameters are determined on the basis of calibrations carried out beforehand. Measuring of flight parameters is a very important task for high-maneuverability airplanes in view of the substantially broadened in-flight angles of attack and a wide range of flight speeds (from slow subsonic speeds to those that far exceed the supersonic speed). This task is rather important for helicopters in connection with their high maneuvering capabilities (i.e., forward or backward, to the right or left, upward or downward flights) and automation of these flight modes using the data obtained from a flight parameter measurement system.

Known is an air-pressure head, comprising a housing in the form of a round cylindrical rod having intake orifices arranged around the cross-section circumference and connected via ducts to nipples (Petounin A. N., Metody—Techniques and Equipment for Measuring the Gas Flow Parameters), M., Machinostroyeniye publishers, 1972, pp. 88–100, FIG. 1.102; Glaznev V. N., Zavaroukhin S. G., Experimental Investigation of Planar and Axially Symmetrical Vortex Flows using a Cylindrical Sensor in a Wide Numeric Range, M., Proceeding of Central Institute for Aerohydrodynamics, vol. 14, N 4, 1983). Flow parameters are determined using said head by measuring the pressures occurring at the windward side of the head in the area of continuous flow according to the calibration relationships that enlink the determined parameters with the measured pressures.

The disadvantages of the APH of the above-discussed type are as follows:

the impossibility of measuring static pressure to an acceptable accuracy in the range of M values from 0.8 to 1.1 due to the known phenomenon of the transonic stabilization;

the impossibility of using, for determining the flow parameters, the inlet orifices disposed at the leeward side in the head's separating flow zone, in which orifices the pressures, though not being subjected to the transonic stabilization effect, strongly depend on Reynolds number, roughness of the surface and turbulence level of the incoming flow;

still another disadvantage, being actually a result of the preceding disadvantage, consists of a significantly excessive number of pressure measuring ducts. For determining three parameters (total pressure $P_1$, static pressure $P_s$ and downwash angle $\alpha$) this APH requires such to be provided with at least three orifices at the windward side in the separation-free zone. Rough estimates demonstrate that when the flow parameters are to be determined within the range of $\alpha=0 \div 360°$. For acceptable sensitivity being maintained, at least 8 to 9 inlet orifices, that are equally spaced (the pitch being 45° or 40°) around the APH cross-section circumference, are required, which results in greater dimensions of an APH, its increased aerodynamic drag, greater weight of structure of an APH itself and also that of measuring instruments, because a pressure sensor must be connected to each of the ducts. Further, this results in a more expensive measuring system based on such APH's.

Known is a device (Europaische Patentschrift, Veroffentlichungsnummer, 0049756 B1, G 01 F 1/46, G 01 L 13/00, Vorrichtung zum Messen des Differenzdruckes; prioritaet: 09.10.80 DE 3038180, Patentinhaber; IWK Regier and Kompensatoren GmbH: Erfinder: Fehbr, Dieter, Dr., Dipl-Phys.) adapted to measure a pressure drop. The basic element of this device is a rod in the form of regular hexagonal prism having on one of its edges an orifice (or a plurality of orifices connected to pneumatic ducts) intended for pressure measuring. When the rod in a flow is oriented such that the flow velocity vector extends through the edge that has an opening, the rod axis and the opposite edge, the pressure approximating the total pressure is sensed using a pressure sensor connected via a pneumatic duct to said orifice(s). When the rod in a flow is oriented such that the orifices thereon are deployed with respect to the velocity vector at 180°, the base pressure can be determined using these orifices. Thus, using APH's of this type, the flow strength (or total $P_t$ and static $P_s$ pressures) can be measured on the basis of the preset calibrations. Said patent proposes the devices consisting of two rods oriented as described above and intended to measure $P_t$ and $P_2$ is gas conduits.

BRIEF SUMMARY OF THE INVENTION

However, such APH, or a device based thereon, are not suitable intrinsically to measure three flow parameters at a time (total pressure $P_t$, static pressure $P_s$ and angle of downwash (attack) $\alpha$) for it lacks the appropriate number of orifices, at least three orifices, for intake of pressures. Actually, the flow parameters are known to be determined on the basis of predetermined relationships between pressures $P_i$ and angle of attack (downwash) $\alpha$ of an undisturbed flow, total $P_t$ and static $P_s$ pressures of an undisturbed flow:

$$P_i = f_i(\alpha, P_t, P_s), \quad (1)$$

measured in an air-pressure head in i number of points of pressure intake. For resolving this system of equations with respect to $\alpha$, $P_t$, $P_s$, it is required to have $i \leq 3$ orifices, and, further, such system of equations must be sufficiently well-posed. For example, when two orifices i=1 and i=2 are located in the separation zone where the pressure is equalized, then $P_1 \approx P_2$ will be effective in a broad range of $\alpha'$, and the system becomes ill-posed or unresolvable. Hence, when it is required to measure parameters of a plane-parallel stream within the range of $\alpha = 0 \div 360°$, the APH body must have, as the analysis of the experimental data demonstrates, $i \leq 4$ orifices, and they are to be distributed such that to perform <<switching>> from some orifices to another ones.

Another disadvantage of the mentioned prior art is the circumstance that the pressure intake orifices are disposed on a prism edge. This results in that even in a slight re-orienting of such APH relative to the flow (the position as discussed above), a flow separates from that edge. This results in a loss of sensitivity to a change in α, i.e. said system of equations (1) becomes unresolvable.

The most pertinent art is an air-pressure head implemented in the form of a rod having cross-section of equilateral triangle. On the rod end face, on the axis common with said rod, positioned is a cylindrical superstructure having cross-section in the form of equilateral triangle whose sides are equal to those of the rod cross-section, said triangle being slewed with respect to the rod cross-section by angle φ=60°. On facets of the rod and superstructure, implemented are six inlet orifices connected via ducts to nipples (Golovkin M. A., Yefremov A. A., Priyomnik vozdoushnogo davleniya, [An Air-Pressure Head], Patent of the RF N 1809341, priority as of Apr. 8, 1991).

The disadvantages of that APH are as follows:
complexity of design;
insufficient accuracy in determining flight parameters, particularly in case of sliding;
an excessive number of pressure-measurement ducts, which circumstance results in a greater weight of an APH itself and a measuring system as a whole.

The object of the invention is to simplify the design, to improve the accuracy of measurement of flight (flow) parameters, and to reduce the APH structure weight and that of a measuring system as a whole.

The contemplated technical results is to be attained with the following technical solution: an air-pressure head is implemented in the form of a multiple-edge rod, whose edges are oriented along the rod axis, having groups of orifices disposed between the edges on smooth lateral surfaces of the rod and connected via pneumatic ducts to outlet nipples disposed off the flow. The edges in the longitudinal direction are continuous and their number is $n \leq 3$; groups of orifices are spaced from the edges that define the lateral surface at the value of a $\leq 0.1$ b, where b is the distance between the edges in any cross-section of the rod; the angle between the lateral surfaces in any cross-section of the rod being $\gamma < 180°$. Thereby the design is simplified and the accuracy of determining of flight parameters in case of sliding is also improved owing to the absence of the tearing-off wake that is outgoing in case of the APH of the most pertinent art from the place of joint of its two parts (the rod and superstructure) and approaching the inlet orifices.

The contemplated technical results is also to be attained using the following arrangement: sharp edges can be rounded or rendered obtuse by chambering, said rounding or chamfer being conjugated with smooth lateral surfaces of the rod at the distance of $c \leq 0.005b$ from the place of conjugation of two contiguous lateral surfaces. Such rounding or chamber can be of the merely technological nature. Said value of $c \leq 0.05b$, according to the experimental investigation findings, actually provides referencing of the flow separation line to the area of conjugation of rounding or chamber to the rod lateral surfaces, whereby independence of measurements from the Reynolds number is ensured. The contemplated technical result is also to be achieved through that the edges are made in the form of protrusions of the rod having height of $h \leq 0.1$ b and being $e \leq 0.1$ b wide, as measured in the rod cross-section. Such shape of said protrusions, provides, as the carried-out experimental investigation demonstrates, referencing of the flow separation line to a protrusion, and also provides independence of measurements from Reynolds number. In certain cases a protrusion-shaped edge is capable of simplifying the design to a considerable extent.

The contemplated technical results is also to be attained through that the rod lateral surface is cylindrical or tapered. Thereby the design is simplified and manufacture thereof becomes less expensive.

The contemplated technical result is also to be attained through that the rod lateral surface between the edges is convex. Such shape of the APH rod allows, on one hand, to minimize influence of Reynolds number in respect of pressure measuring, and, on the other hand, to improve the instrument sensitivity owing to growth of derivative of measured pressures with respect to the downwash angle, which results in a substantial decrease of number of instrumental errors which occur.

The contemplated technical result is also to be attained through the fact that the number of edges on the rod is selected to be four, five or six edges, depending on the needed range of angles of attack, wherein the flight (flow) parameters are to be measured. In particular, when measurements are to be done within the range of $-90° < \alpha < 90°$, as the carried-out trails demonstrate, it will be sufficient to use a four-edge rod, because on a rod two pressures (e.g., $P_1$ and $P_2$), being sufficiently sensitive to changes in α, $P_r$, $P_s$, at the APH windward side can always be selected, and one pressure ($P_3$) can be taken at the leeward, base side of an APH. Then, as the carried-out experiments demonstrate, said system of equations (1) is resolvable with respect to α, $P_r$, $P_s$, and thereby the required number of the pressure measurement ducts could be reduced with the effect of a reduced weight of an APH itself and a measuring system as a whole. When the required range of angles of attack is $\alpha = 0 \div 360°$, wherein the flight (flow) parameters are to be measured, as the experiment findings demonstrates, either the five- or six-edge rod has to be used.

BRIEF DESCRIPTION OF THE DRAWINGS

FIGS. 1–3 and 4–6 show two exemplary embodiments of the air-pressure head of the invention.

FIGS. 7–10 shows embodiments of the APH of the invention, wherein FIG. 8 shows edges which are rounded and FIG. 9 shows the edges rendered obtuse by chamfering.

FIGS. 20–25 show exemplary embodiments of the APH of the invention, having, respectively, a cylindrical and tapered lateral surface on a rod.

FIGS. 26–28, 29–31 and 32–34 show exemplary embodiments of the APH of the invention, wherein a rod has, respectively, four, five and six edges.

DETAILED DESCRIPTION OF THE INVENTION

Figure 36:
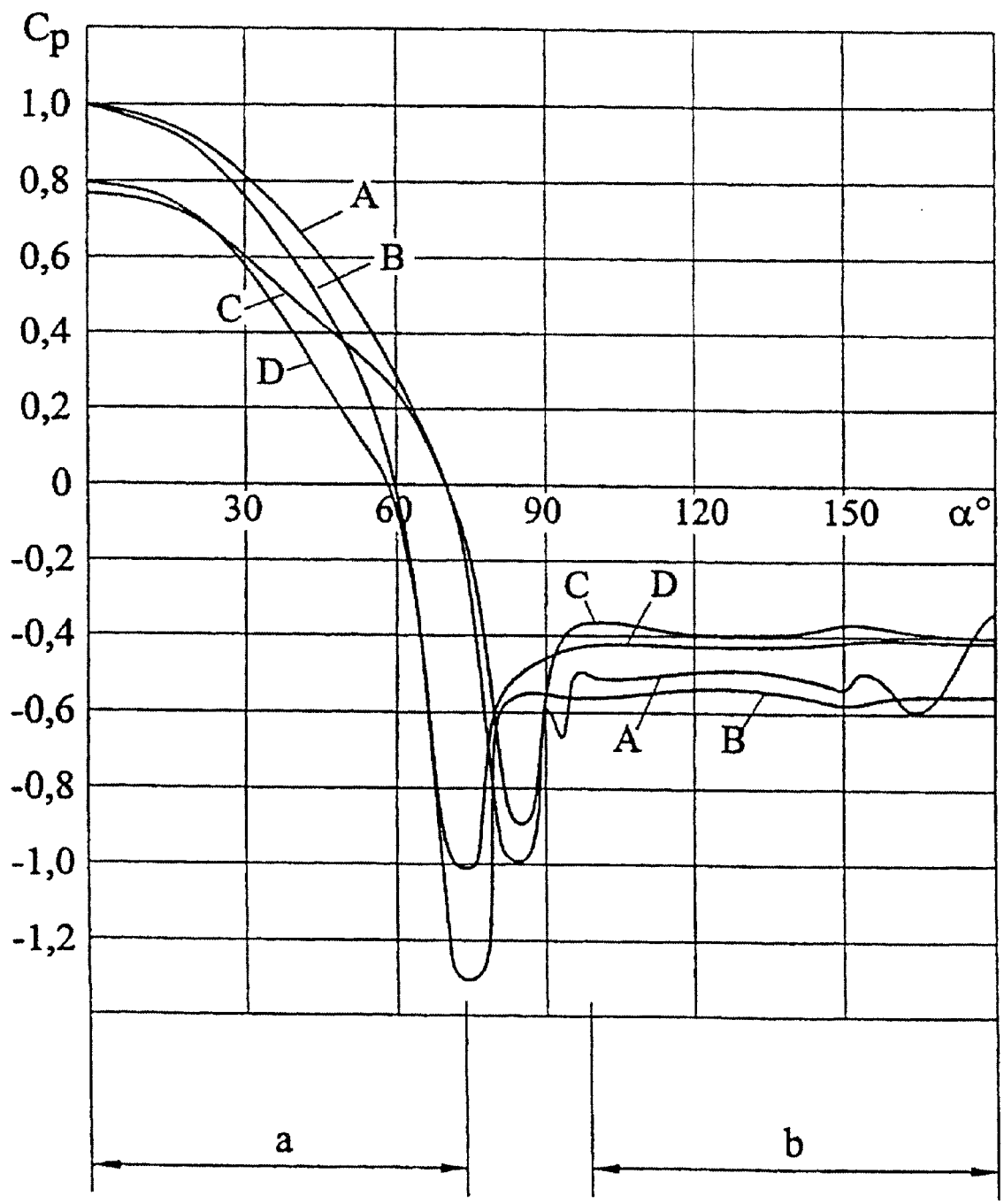

FIG. 36 shows varying of pressure ratio $C_P = (P-P_s)/q$ (where P is the pressure sensed on one of the lateral surfaces of the most pertinent prior art APH superstructure, or those of the proposed APH rod; $P_s$ is static pressure, q is dynamic pressure) when the flow downwash angle α varies from 0 to 180°, for the best mode of embodiment of the proposed APH and for the most pertinent art APH with respect to the flow sliding angle β'=0 and β'=30°. This FIG. uses the following designations:

A—the most pertinent art APH wherein β'=0;
B—the best mode of embodiment of the proposed APH wherein β'=0;
C—the most pertinent art APH wherein β'=30°;
D—the best mode of embodiment of the proposed APH wherein β'=30°.

Figure 37:
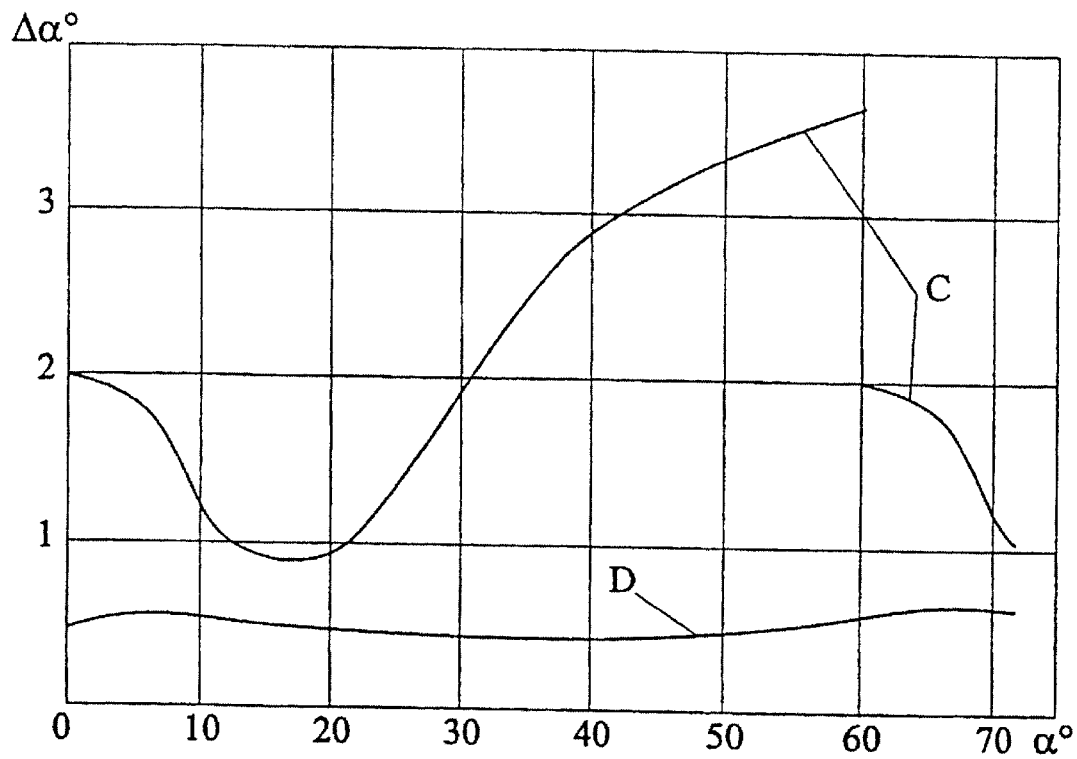
Figure 38:
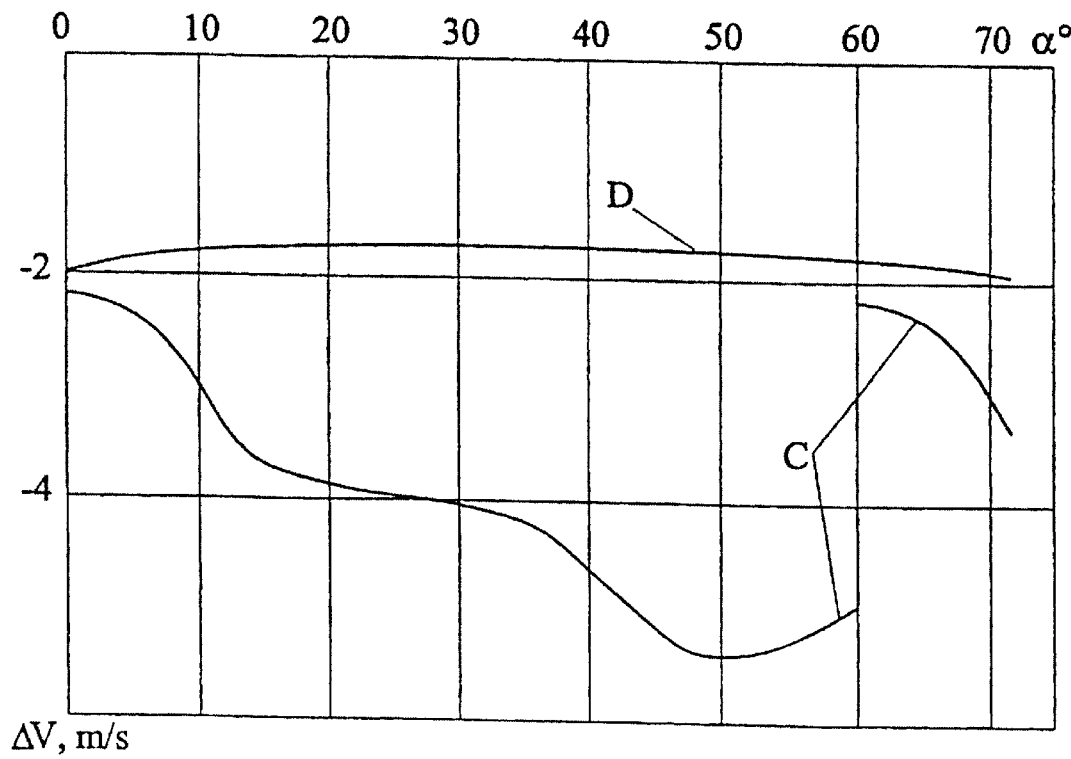

FIGS. 37 and 38 shows an example of summary errors Δ☐ and ΔV in determining the downwash angle α and velocity V using the best mode of embodiment of the proposed APH (curve D) and the most pertinent art APH (curves C), as defined basing on the experiment findings at slow flow velocity V=15 m/s for values of β'=30°.

Figure 39:
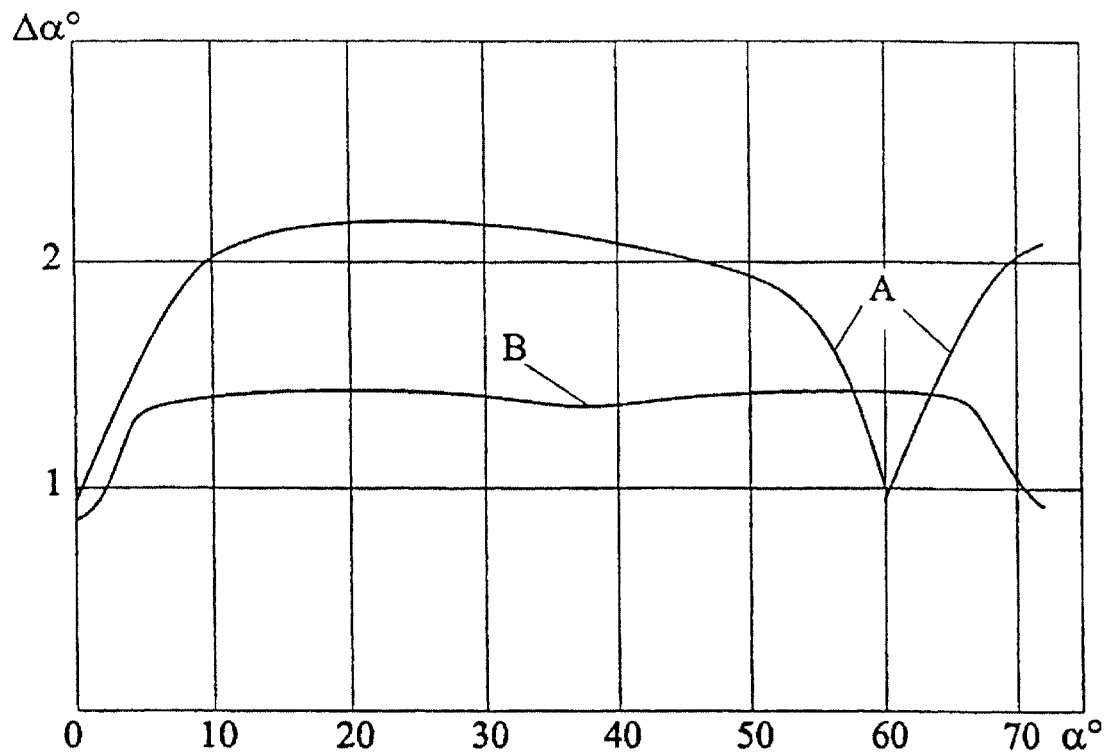
Figure 40:
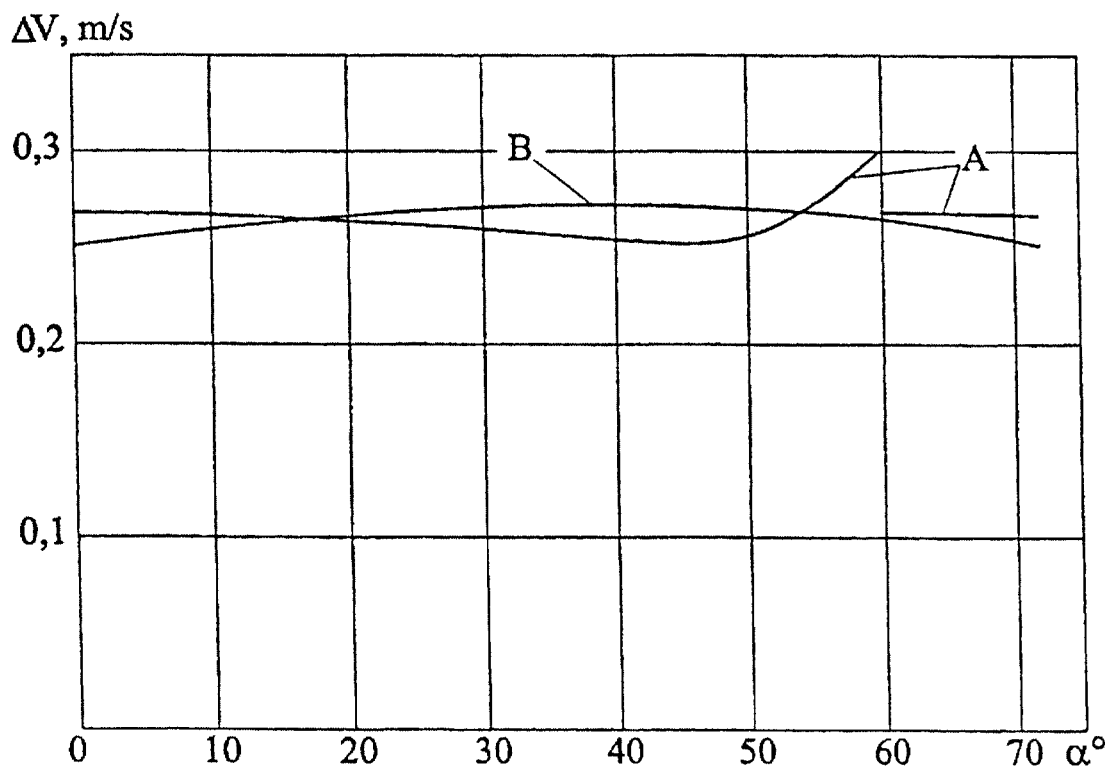

FIGS. 39 and 40 shows instrumental errors Δ☐ and ΔV in determining the downwash angle α and velocity V using the best mode of embodiment of the proposed APH (curve A) and the most pertinent art APH (curves B), pressure measurement error being 0.5 mm of water col., as defined basing on the experiment findings at slow flow velocity V=15 m/s for values of β'=30°.

One possible air-pressure head of the invention comprises multiple-edge rod 1, whose edges 2 are oriented in the longitudinal direction of rod 1, having groups of orifices 3 between edges 2 connected via pneumatic ducts 4 to nipples 5. Edges 2 in the longitudinal direction are continuous, their number being n≦3, and groups of orifices 3 are disposed between edges 2 on smooth lateral surfaces 6 of rod 1 and are spaced from edges 2 at the value of a ≦0.1b, where b is the distance between the edges in any cross-section of the rod, angle γ between lateral surfaces 6 in any cross-section of the rod being γ<180°. Sharp edges 2 in the proposed APH can be rounded or rendered obtuse by chamfering, said rounding or chamber being conjugated with smooth lateral surfaces 69 of the rod 1 at a distance of c≦0.05b from the place of conjugation of two contiguous lateral surfaces. The edges 2 can be made in the form of protrusions on rod 1 having height of h≦0.1 b and being e≦0.1 b wide at the vertex, as measured in the rod cross-section. Lateral surfaces 6 of the rod can be cylindrical, tapered, convex. The number of n of edges 2 on the rod, depending on specific tasks to be fulfilled, can vary and can be four, five or six, for example. The rod cross-section needs not be of perfect circularity.

Figure 7:
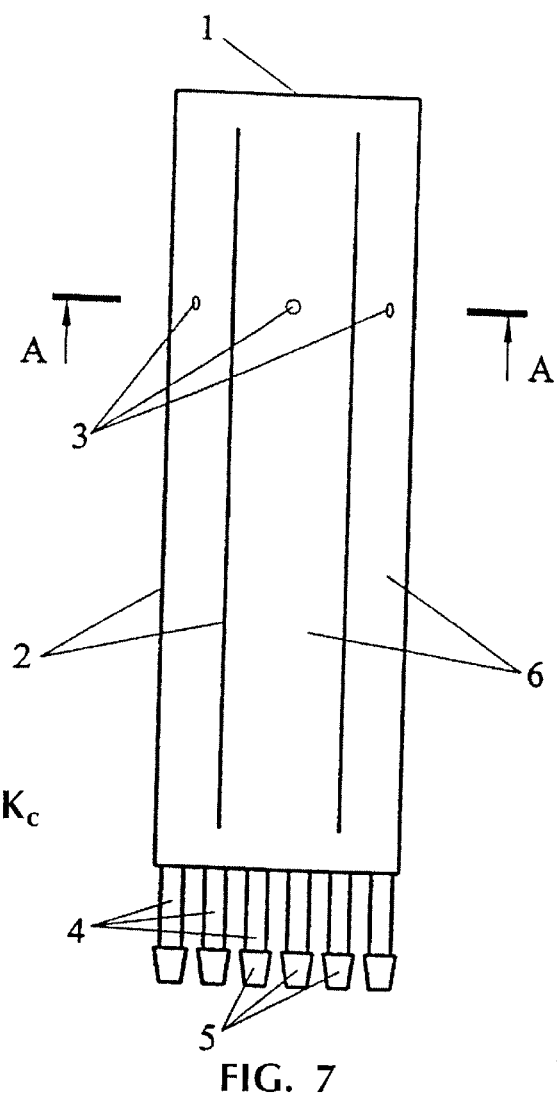
Figure 8:
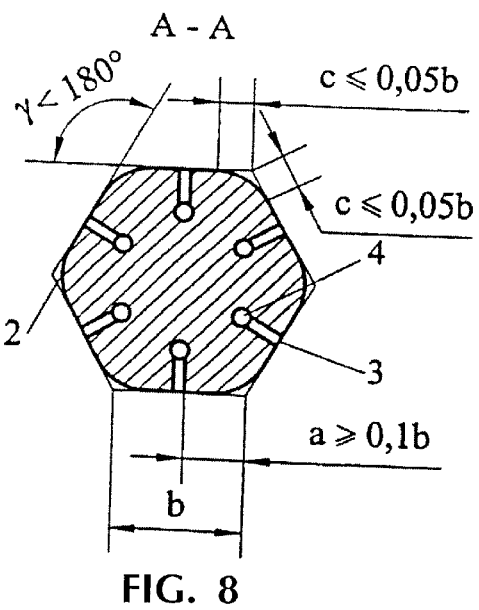
Figure 9:
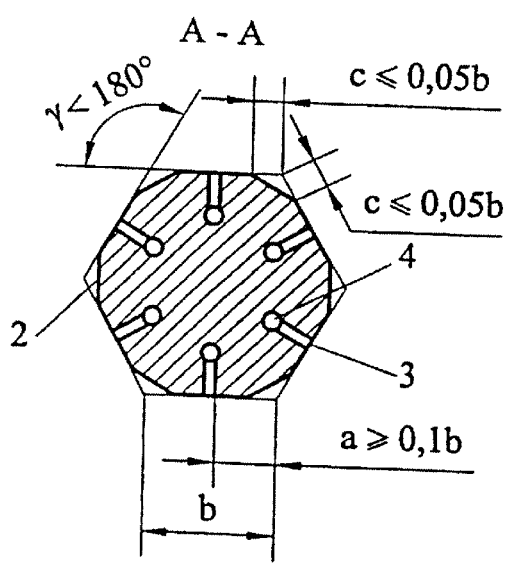
Figure 10:
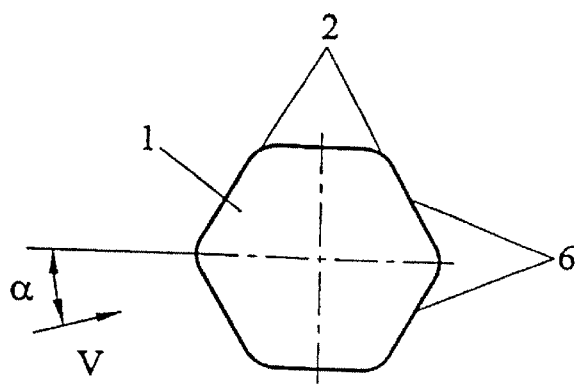
Figure 11:
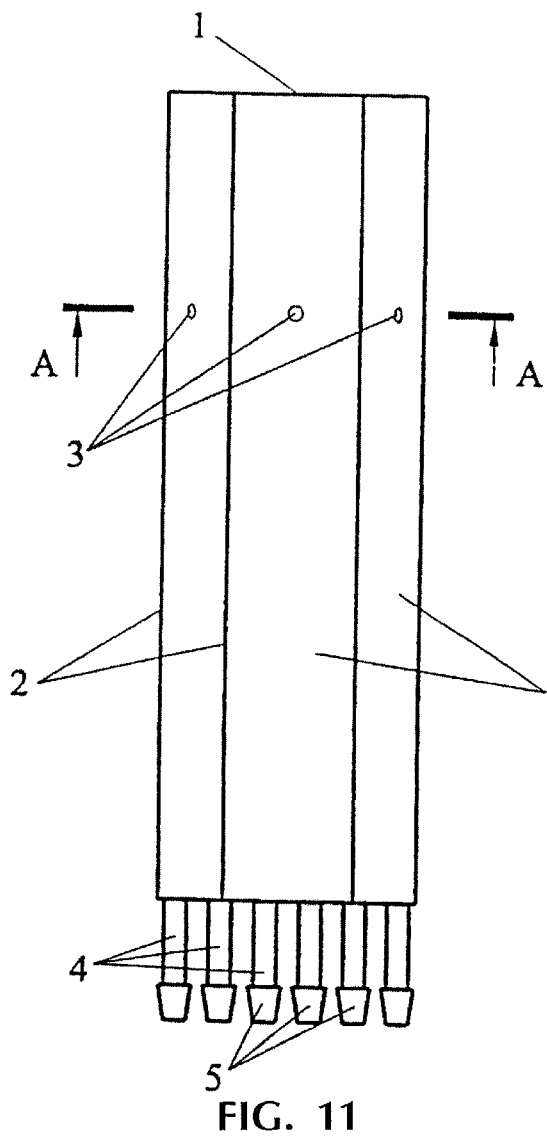
FIGS. 11–19 shows exemplary embodiments of the APH according to the invention, wherein the edges are implemented in the form of a protrusion on a rod.
Figure 12:
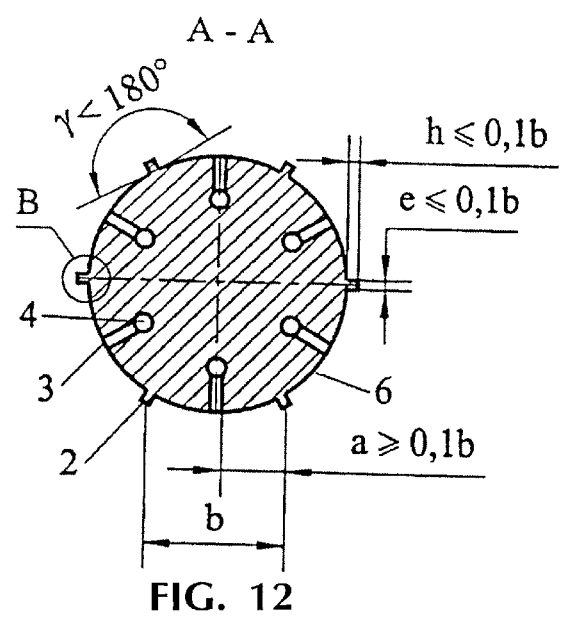
Figure 13:
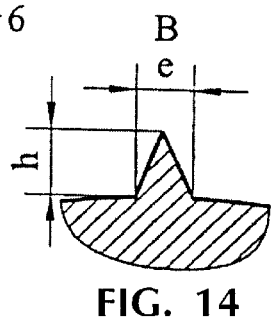
Figure 14:
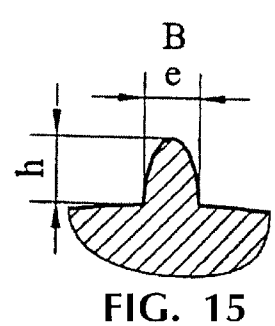
Figure 15:
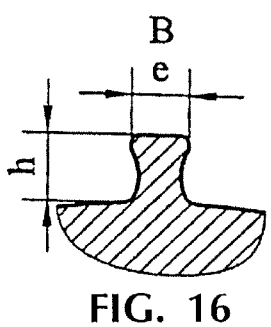
Figure 16:
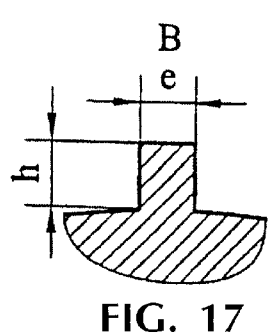
Figure 17:
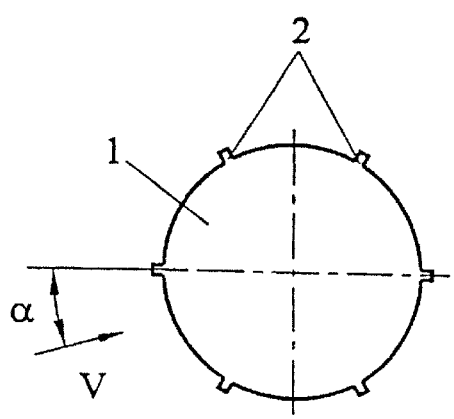
Figure 18:
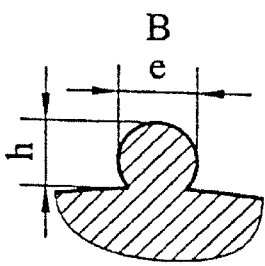
Figure 19:
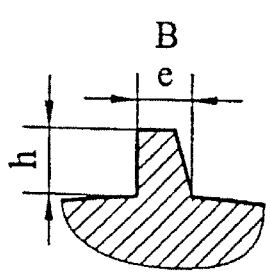
Figure 29:
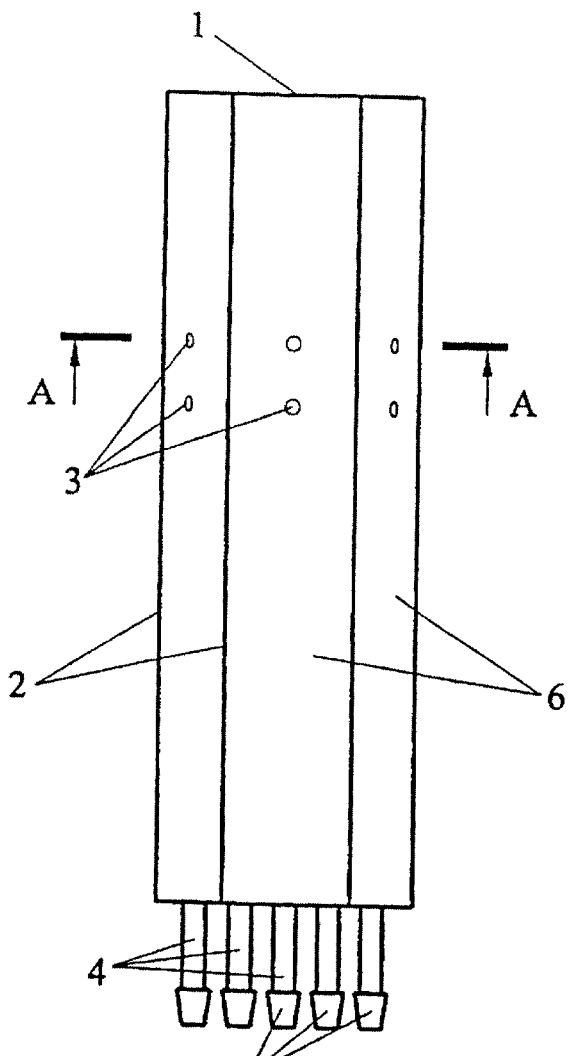
Figure 30:
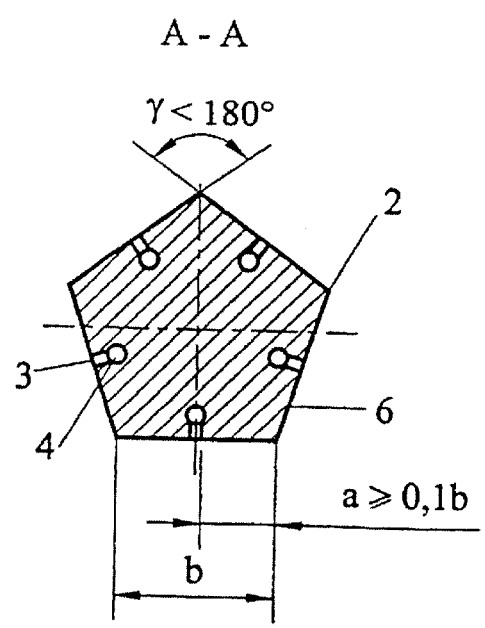
Figure 31:
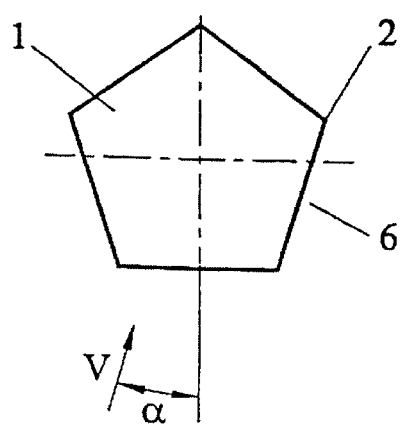
Figure 35:
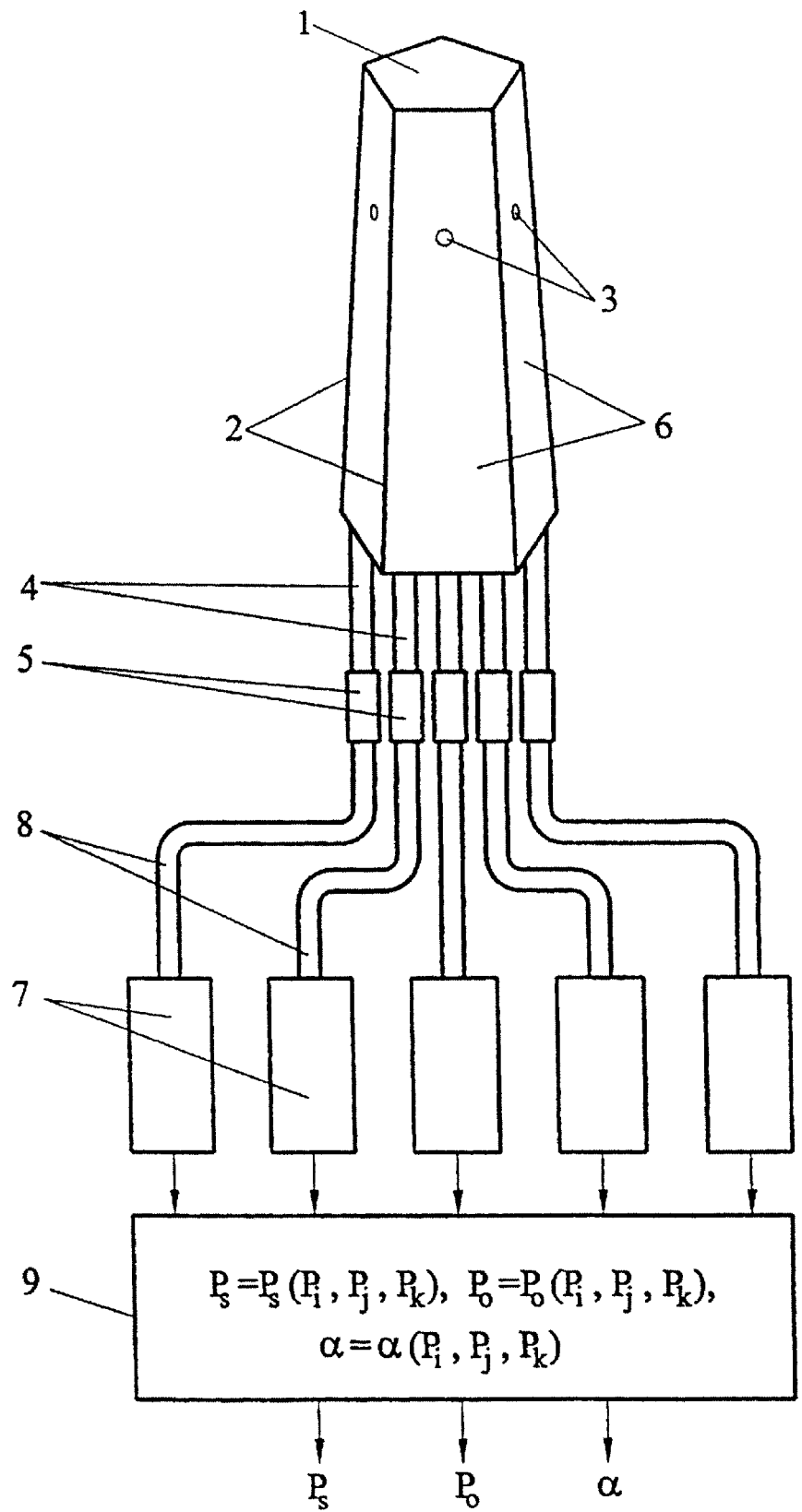
FIG. 35 shows the best mode of embodying the APH of the invention in the form of a rod having a tapered lateral surface with planar facts, having the cross-section of a regular pentagon, and shows an example of the use of the proposed APH in a device for determining flight (flow) parameters.

The proposed air-pressure head is operated as follows. Pressures sensed by intake orifices 3 are transferred via pneumatic ducts 4 and measured with instruments— pressure sensors 7 (FIG. 35) connected via pneumatic dusts 8 to nipples 5. Based on the measured pressure values, computing unit 9 calculates the flow parameters values: α, $P_n$, $P_s$ using the calibration relationships pre-stored in unit 9 in the form of tables of tables or functions. In the preset calibrations and in computing the flow parameters, the pressures of three groups of the intake orifices are used: two orifices at the windward side, and one orifice at the leeward side, i.e. from the zones designated in FIG. 36 as "a" and "b". Orifice groups are selected algorithmically by comparing the sensed pressure values, taking into account the circumstance that the windward inlet orifices correspond to the maximal pressure values.

Owing to the proposed arrange of an APH, where edges in the longitudinal direction are continuous, and the rod lateral surfaces between the edges, wherein the inlet orifices are disposed, are smooth, the proposed APH has no outgoing tearing-off wake, in case of the most pertinent art APH, at the juncture of its two parts (the rod and superstructure) when sliding is present. Thereat, errors Δ☐ and ΔV in determining of downwash angle α and velocity V which exist when sliding is present (FIGS. 37, 38) are reduced.

When the number of edges in the proposed APH is n>3, then derivative α $C_p$/δ α of the pressure ratio at downward angle at the windward lateral surfaces of the proposed APH has a greater value (FIG. 36) than in the most pertinent art APH (where n=3). In case the lateral surfaces between the edges are convex, the value of derivative α $C_p$/δ αhas a still greater value. As a result, the instrumental error level in determining downward angle Δ☐ for the proposed air-pressure head is about two times less than in the most pertinent art APH, and the instrumental error level in determining velocity value ΔV coincides with the most pertinent art (FIGS. 39, 40).

As the proposed APH consists of a rod, and the most pertinent art APH is essentially a composite device and comprises a rod and superstructure, the air-pressure head design is simplified to a considerable extent. The design can be simplified also in case of use, on the proposed APH, of the edges implemented in the form of protrusions, as well as in the case when the rod lateral surfaces of the proposed APH are cylindrical or tapered. Thereby the design becomes not only simpler, but also its manufacturing becomes less expensive.

For example, when the proposed APH for the required range of −90°<α<90° as having four edges, or the proposed five-edge APH for the range of α=0÷360° are selected, the required number of measuring ducts can be reduced, as compared with the most pertinent art, by 2 ducts in case of the four-edge rod of the proposed APH, and by 1 duct in case of the five-edge rod of the proposed APH. Thereby, owing to a reduced number of the required pressure sensors, the weight of the APH itself and the measuring system as a whole can be remarkably lowered.

Thus, the use of the proposed air-pressure head allows one to simplify the design, improve accuracy of the flow (flight) parameter measurements and also reduce the weight of the APH and the measuring system as a whole. All these features serve to strengthen the competitiveness of the proposed APH to an essential degree.

What is claimed is:

1. An air-pressure head for determining parameters of an air flow, which comprises:
   a multi-edged rod, said rod having substantially smooth lateral surfaces, a plurality of pneumatic channels formed therein and a plurality of nipples connected thereto, said rod having edges which are oriented in a longitudinal direction of said rod, said rod having groups of orifices formed therein disposed between the edges on the smooth lateral surfaces of the rod which are connected via the pneumatic channels to said outlet nipples, said outlet nipples in turn being connected to pressure sensors, wherein the edges of the rod are continuous in the longitudinal direction thereof, the number of edges is greater than three, and said groups of orifices are spaced from the edges that define the lateral surfaces by a distance a ≦0.1b, where b is the distance between the edges in any cross-section of the rod and wherein an angle γ formed between the lateral surfaces of the rod in any cross-section of the rod is ≦180°.

2. The air-pressure head as claimed in claim 1, wherein the sharp edges comprise one of rounded edges and obtuse edges, said rounded or chamfered edges being conjugated with smooth lateral surfaces of the rod at a distance of c≦0.5b from a place of conjugation of two contiguous lateral surfaces.

3. The air-pressure head as claimed in claim 1, wherein the edges comprise protrusions on the rod having a height of $h \leqq 0.1b$ and having a width $3 \leqq 0.1b$ as measured in a cross-section of said rod.

4. The air-pressure head as claimed in claim 1, wherein said lateral surfaces of said rod comprise cylindrical surfaces.

5. The air-pressure head as claimed in claim 1, wherein said lateral surfaces of said rod comprise tapered surfaces.

6. The air-pressure head as claimed in claim 1, wherein said lateral surfaces of said rod comprise convex surfaces.

7. The air-pressure head as claimed in claim 1, wherein the edges of the rod comprise four edges.

8. The air-pressure head as claimed in claim 1, wherein the edges of the rod comprise five edges.

9. The air-pressure head as claimed in claim 1, wherein the edges of the rod comprise six edges.

* * * * *

UNITED STATES PATENT AND TRADEMARK OFFICE
CERTIFICATE OF CORRECTION

PATENT NO. : 6,557,423 B1
DATED : May 6, 2003
INVENTOR(S) : Evgeny S. Vozhdaev et al.

It is certified that error appears in the above-identified patent and that said Letters Patent is hereby corrected as shown below:

Title page, Item [54] and Column 1, line 1,
Title, change "AIR-PRESSURE SENSOR" to -- AIR-PRESSURE HEAD --;

Title page,
Item [75], Inventors, change "Moksovskaya" to -- Moskovskaya --; and change "Moskovsakaya" to -- Moskovskaya --;
Item [57], ABSTRACT,
Line 9, change "$n < 3$" to -- $n > 3$ --; and
Line 11, change "$a \leq 0.1 b$" to -- $a \geq 0.1 b$ --;

Column 2,
Line 52, change "$i \leq 3$" to -- $i \geq 3$ --;
Line 56, change "$\alpha'$" to -- $\alpha\grave{}$, --;
Line 60, change "$i \leq 4$" to -- $i > 4$ --;

Column 3,
Line 33, change "$n \leq 3$;" should be -- $n \geq 3$; --;
Line 35, change "$a \leq 0.1b$," to -- $a \geq 0.1b$, --;

Column 5,
Lines 10 and 15, change "$\Delta \square$" to -- $\Delta \alpha$ --;
Line 26, change "$n \leq 3$," to -- $n > 3$, --;
Line 28, change "$a \leq 0.1b$," to -- $a \geq 0.1b$, --;
Line 34, change "surfaces 69" to -- surfaces 6 --;
Line 50, change delete 1 typing of "of tables";

Column 6,
Line 8, change "$\Delta \square$" to -- $\Delta \alpha$ --;
Line 55, change "$a \leq 0.1b$" to -- $a \geq 0.1b$ --;
Line 59, change "$\leq 180º$" to -- $< 180º$ --;
Line 64, change "$c \leq 0.5b$" to -- $c \leq 0.05b$ --; and

UNITED STATES PATENT AND TRADEMARK OFFICE
CERTIFICATE OF CORRECTION

PATENT NO.    : 6,557,423 B1
DATED         : May 6, 2003
INVENTOR(S)   : Evgeny S. Vozhdaev et al.

It is certified that error appears in the above-identified patent and that said Letters Patent is hereby corrected as shown below:

<u>Column 7,</u>
Line 1, change "$3 \leq 0.1b$" to -- $e \leq 0.1b$ --.

Signed and Sealed this

Ninth Day of March, 2004

JON W. DUDAS
*Acting Director of the United States Patent and Trademark Office*